United States Patent
Kawanai et al.

(10) Patent No.: US 12,415,518 B2
(45) Date of Patent: Sep. 16, 2025

(54) TRAVEL PLANNER AND METHOD FOR TRAVEL PLANNING

(71) Applicant: TOYOTA JIDOSHA KABUSHIKI KAISHA, Toyota (JP)

(72) Inventors: Taichi Kawanai, Susono (JP); Yusuke Hayashi, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 18/242,568

(22) Filed: Sep. 6, 2023

(65) Prior Publication Data
US 2024/0101119 A1    Mar. 28, 2024

(30) Foreign Application Priority Data
Sep. 22, 2022    (JP) .............................. 2022-151733

(51) Int. Cl.
*B60W 30/18* (2012.01)
*B60W 40/08* (2012.01)
*B60W 60/00* (2020.01)

(52) U.S. Cl.
CPC ...... *B60W 30/18163* (2013.01); *B60W 40/08* (2013.01); *B60W 60/001* (2020.02); *B60W 2554/4041* (2020.02); *B60W 2554/80* (2020.02)

(58) Field of Classification Search
CPC ........... B60W 30/18163; B60W 40/08; B60W 60/001; B60W 2554/4041; B60W 2554/80; B60W 2540/01; B60W 30/18154; B60W 2720/103; B60W 30/143; G05D 1/00; G01C 21/00; G08G 1/00

See application file for complete search history.

(56) References Cited

U.S. PATENT DOCUMENTS

| | | | |
|---|---|---|---|
| 10,510,254 B2 * | 12/2019 | Arndt | G08G 1/166 |
| 10,650,673 B1 * | 5/2020 | Elsheemy | G08G 1/087 |
| 11,100,804 B2 * | 8/2021 | Kurehashi | G08G 1/163 |
| 11,142,246 B2 * | 10/2021 | Fujii | G05D 1/0246 |
| 12,367,771 B2 * | 7/2025 | Quirynen | G08G 1/0145 |
| 2007/0225907 A1 * | 9/2007 | Oonishi | G01C 21/3658 |
| | | | 701/411 |
| 2010/0004839 A1 * | 1/2010 | Yokoyama | G08G 1/096783 |
| | | | 701/70 |
| 2011/0098916 A1 * | 4/2011 | Jang | G01C 21/3697 |
| | | | 701/533 |

(Continued)

FOREIGN PATENT DOCUMENTS

| | | |
|---|---|---|
| JP | 2007-141144 A | 6/2007 |
| JP | 2009-048458 A | 3/2009 |

(Continued)

*Primary Examiner* — Angelina M Shudy
(74) *Attorney, Agent, or Firm* — Dinsmore & Shohl LLP

(57) ABSTRACT

A travel planner identifies, for a connection point where a travel lane in which a vehicle is traveling connects ahead of the vehicle with another lane different from the travel lane, an entry time range representing a time range during which entry of the vehicle from the travel lane to the connection point is recommended, and creates a travel plan including a transition of travel speed of the vehicle from a current position of the vehicle to the connection point so as to arrive at the connection point within the entry time range.

9 Claims, 7 Drawing Sheets

(56) References Cited

U.S. PATENT DOCUMENTS

| | | | |
|---|---|---|---|
| 2012/0146814 A1* | 6/2012 | Kim | G08G 1/096783 |
| | | | 340/929 |
| 2017/0183013 A1* | 6/2017 | Matsumoto | B60W 30/16 |
| 2017/0259819 A1* | 9/2017 | Takeda | B60W 30/18163 |
| 2018/0261098 A1* | 9/2018 | Gupta | G08G 1/166 |
| 2018/0297638 A1* | 10/2018 | Fujii | B60W 30/12 |
| 2018/0297639 A1* | 10/2018 | Fujii | G05D 1/0246 |
| 2018/0297640 A1* | 10/2018 | Fujii | B62D 6/04 |
| 2018/0364723 A1* | 12/2018 | Cullinane | B60W 30/09 |
| 2019/0001993 A1* | 1/2019 | Visintainer | B60W 50/14 |
| 2019/0043353 A1* | 2/2019 | Kim | G05D 1/0088 |
| 2019/0049264 A1* | 2/2019 | Malkes | G08G 1/0116 |
| 2019/0107840 A1* | 4/2019 | Green | G05D 1/0223 |
| 2019/0156677 A1* | 5/2019 | Nishimura | G08G 1/04 |
| 2019/0176844 A1* | 6/2019 | Sedlmayr | B60W 40/04 |
| 2019/0287406 A1* | 9/2019 | Kurehashi | B60W 30/0956 |
| 2019/0337530 A1* | 11/2019 | Hiramatsu | G05D 1/0088 |
| 2020/0004268 A1* | 1/2020 | Park | G01C 21/3658 |
| 2020/0074863 A1* | 3/2020 | Jung | G08G 1/164 |
| 2020/0342754 A1* | 10/2020 | Nakamura | G01C 21/26 |
| 2021/0070289 A1* | 3/2021 | Yu | G06V 20/588 |
| 2021/0158692 A1* | 5/2021 | Uenoyama | G08G 1/0133 |
| 2021/0261162 A1* | 8/2021 | Hiramatsu | G08G 1/167 |
| 2021/0312800 A1* | 10/2021 | Andréasson | G08G 1/093 |
| 2022/0165159 A1* | 5/2022 | Cho | B60W 30/18159 |
| 2023/0219447 A1* | 7/2023 | Ehara | B60L 53/68 |
| 2023/0306546 A1* | 9/2023 | Li | G06Q 50/40 |
| 2024/0042928 A1* | 2/2024 | Nojiri | B60Q 1/508 |
| 2024/0067187 A1* | 2/2024 | Kumbar | B60W 40/12 |
| 2024/0240953 A1* | 7/2024 | Yamamuro | G01C 21/3492 |
| 2024/0321089 A1* | 9/2024 | Tozawa | G08G 1/04 |
| 2025/0162590 A1* | 5/2025 | Terabayashi | B60W 60/001 |

FOREIGN PATENT DOCUMENTS

| | | |
|---|---|---|
| JP | 2013-045196 A | 3/2013 |
| JP | 2017-117328 A | 6/2017 |
| JP | 2018-173800 A | 11/2018 |
| JP | 2021-512376 A | 5/2021 |
| JP | 2022-108200 A | 7/2022 |
| WO | 2020/124440 5 | 6/2020 |

\* cited by examiner

FIG. 4A
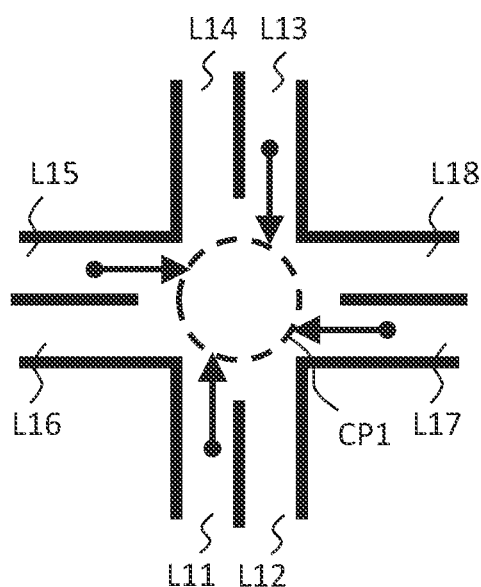
FIG. 4B
| IN | OUT | ENTRY TIME RANGE |
|---|---|---|
| L11 | L14 | 0:00 - 0:15 |
| L11 | L16 | 0:00 - 0:15 |
| L11 | L18 | 0:00 - 0:15 |
| L13 | L12 | 0:00 - 0:15 |
| L13 | L16 | 0:00 - 0:15 |
| L13 | L18 | 0:00 - 0:15 |
| L15 | L12 | 0:20 - 0:25 |
| L15 | L14 | 0:20 - 0:25 |
| L15 | L18 | 0:20 - 0:25 |
| L17 | L12 | 0:20 - 0:25 |
| L17 | L14 | 0:20 - 0:25 |
| L17 | L16 | 0:20 - 0:25 |
FIG. 4C
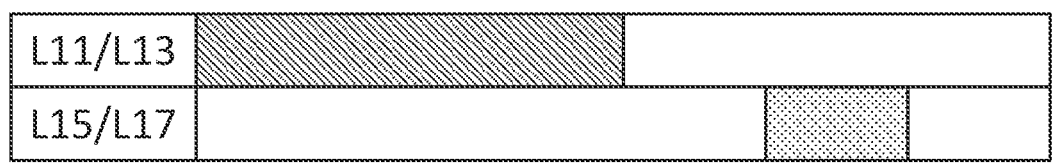

FIG. 5A
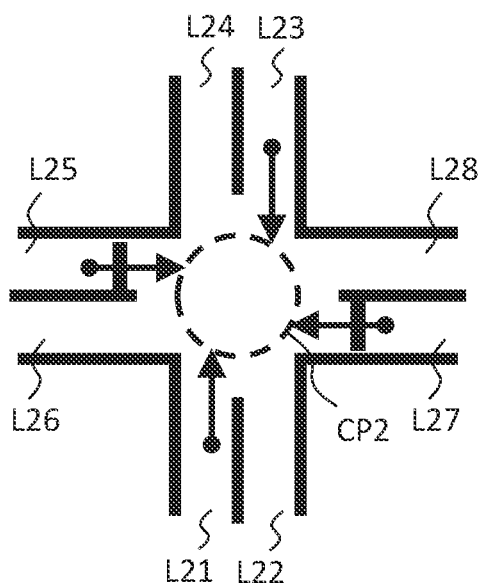
FIG. 5B
| IN | OUT | ENTRY TIME RANGE | AVOIDANCE TIME RANGE |
|---|---|---|---|
| L21 | L24 | 0:00 - 0:15 | - |
| L21 | L26 | 0:00 - 0:15 | - |
| L21 | L28 | 0:00 - 0:15 | - |
| L23 | L22 | 0:00 - 0:15 | - |
| L23 | L26 | 0:00 - 0:15 | - |
| L23 | L28 | 0:00 - 0:15 | - |
| L25 | L22 | 0:20 - 0:25 | 0:02 - 0:18 |
| L25 | L24 | 0:20 - 0:25 | 0:02 - 0:18 |
| L25 | L28 | 0:20 - 0:25 | 0:02 - 0:18 |
| L27 | L22 | 0:20 - 0:25 | 0:02 - 0:18 |
| L27 | L24 | 0:20 - 0:25 | 0:02 - 0:18 |
| L27 | L26 | 0:20 - 0:25 | 0:02 - 0:18 |
FIG. 5C
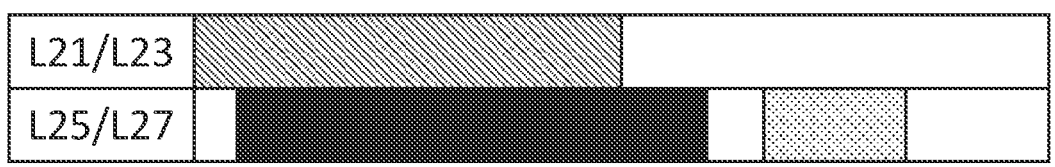

FIG. 6A
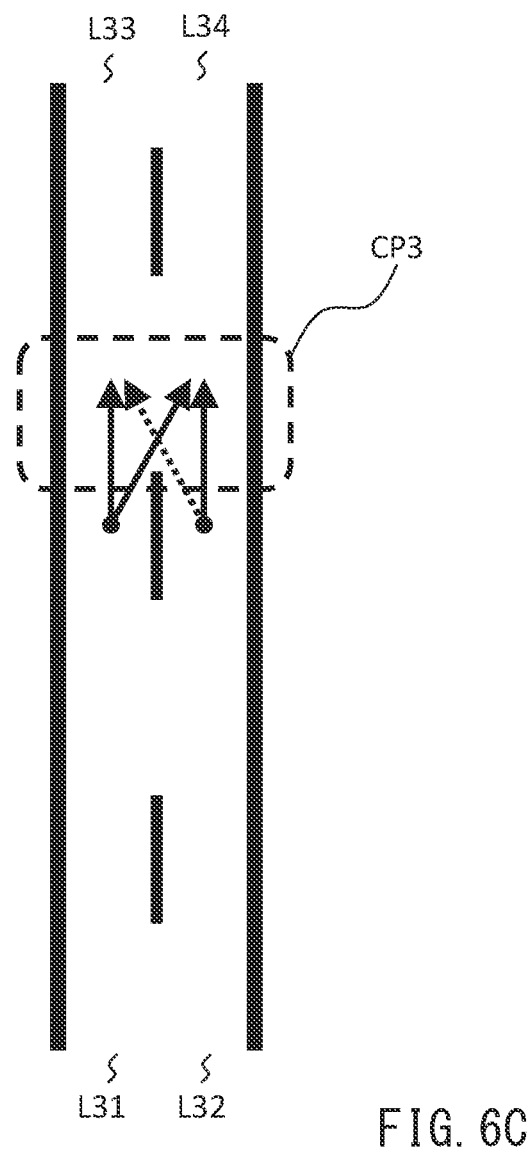
FIG. 6B
| IN | OUT | ENTRY TIME RANGE |
|---|---|---|
| L31 | L33 | 0:00 - 0:06 |
| L31 | L34 | 0:03 - 0:05 |
| L32 | L33 | - |
| L32 | L34 | 0:00 - 0:02 |
FIG. 6C
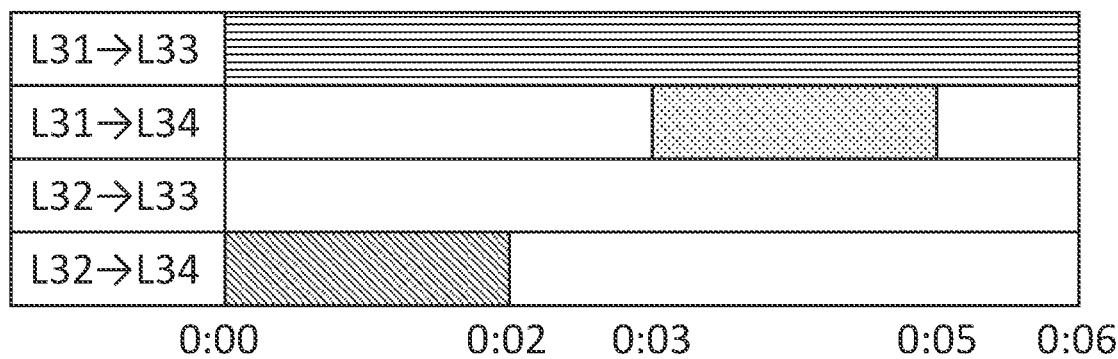

TRAVEL PLANNER AND METHOD FOR TRAVEL PLANNING

CROSS-REFERENCE TO RELATED APPLICATION

This application claims priority to Japanese Patent Application No. 2022-151733 filed on Sep. 22, 2022, the entire contents of which are herein incorporated by reference.

FIELD

The present disclosure relates to a travel planner for travel planning for a vehicle, and a method thereof.

BACKGROUND

At a connection point where one lane and another lane connect such as an intersection, it is preferable to control traffic flow so that vehicles do not enter from each lane at the same time in order to prevent collisions of the vehicles entering from each lane. Traffic signal control is used as an example of traffic flow control at a connection point.

Japanese Unexamined Patent Publication No. 2009-048458 describes a driving support device which can improve the prediction accuracy of a predicted time to arrive at an intersection and appropriately perform driving support using a traffic light signal cycle.

SUMMARY

On the connection point where traffic lights are not installed, traffic participants are required to travel under self-control. When vehicles traveling by autonomous driving control by a travel controller arrive at such a connection point from different directions at the same time, a situation can arise where both vehicles keep stalling without entering the connection point in an attempt to let the other enter first.

It is an object of the present disclosure to provide a travel planner that can create a smoother travel plan at a connection point in a travel lane.

The spirit of the present disclosure is as described below.

(1) A travel planner, comprising a processor configured to:
identify, for a connection point where a travel lane in which a vehicle is traveling connects ahead of the vehicle with another lane different from the travel lane, an entry time range representing a time range during which entry of the vehicle from the travel lane to the connection point is recommended, and
create a travel plan including a transition of travel speed of the vehicle from a current position of the vehicle to the connection point so as to arrive at the connection point within the entry time range.

(2) The travel planner according to item (1), wherein the entry time range is a time range, in a predetermined period repeating from a predetermined time, defined by an elapsed time from start of the period.

(3) The travel planner according to item (1) or (2), wherein the processor:
in the identification, further identifies, for the connection point, an avoidance time range representing a time range during which avoidance of entry of the vehicle from the travel lane to the connection point is recommended, and
in the creation, creates the travel plan so as to not arrive at the connection point within the avoidance time range.

(4) The travel planner according to any one of items (1) to (3), wherein the processor, in the identification, identifies the connection point where a traffic light for controlling entry of the vehicle is not installed, and identifies the entry time range for this connection point.

(5) The travel planner according to any one of items (1) to (4), wherein the processor, in the identification, identifies the entry time range by identifying the lane connected to the connection point based on a current position and a direction of travel of the vehicle in reference to a storage device mounted on the vehicle storing in advance the entry time range for each lane connected to the connection point.

(6) The travel planner according to any one of items (1) to (5), wherein the processor further executes travel control including control of at least acceleration/deceleration of the vehicle in accordance with the travel plan.

(7) The travel planner according to item (6), wherein the processor:
further detects a trailing vehicle traveling behind the vehicle from rear data representing a situation behind the vehicle, and
in the travel control, does not execute travel control in accordance with the travel plan when no trailing vehicles are detected.

(8) The travel planner according to item (6) or (7), wherein the processor:
further detects a passenger different from a driver capable of executing driving operations of the vehicle from in-cabin data representing a situation in a cabin of the vehicle, and
in the travel control, does not execute travel control in accordance with the travel plan when no passengers other than the driver are detected.

(9) The travel planner according to any one of items (6) to (8), wherein the processor:
in the identification, further identifies whether or not the connection point is a temporary stop connection point where it is necessary to stop before entering from the travel lane, and
in the travel control, does not execute travel control in accordance with the travel plan when the connection point is the temporary stop connection point.

(10) A method for travel planning having a travel planner for creating a travel plan for a vehicle execute a process comprising:
identifying, for a connection point where a travel lane in which the vehicle is traveling connects ahead of the vehicle with another lane different from the travel lane, an entry time range representing a time range during which entry of the vehicle from the travel lane to the connection point is recommended, and
creating the travel plan including a transition of travel speed of the vehicle from a current position of the vehicle to the connection point so as to arrive at the connection point within the entry time range.

(11) A non-transitory computer readable medium having a computer program for travel planning stored therein, the computer program causing a computer mounted on a vehicle to execute a process comprising:
identifying, for a connection point where a travel lane in which the vehicle is traveling connects ahead of the vehicle with another lane different from the travel lane, an entry time range representing a time range during which entry of the vehicle from the travel lane to the connection point is recommended, and
creating a travel plan including a transition of travel speed of the vehicle from a current position of the vehicle to the connection point so as to arrive at the connection point within the entry time range.

The travel planner according to the present disclosure can create a smoother travel plan at a connection point in a travel lane.

BRIEF DESCRIPTION OF DRAWINGS

FIG. 4A schematically illustrates a first example of a connection point, FIG. 4B illustrates an entry time range for the first example of a connection point, and FIG. 4C is a time chart of the entry time range of the first example of a connection point.

FIG. 5A schematically illustrates a second example of a connection point, FIG. 5B illustrates an entry time range for the second example of a connection point, and FIG. 5C is a time chart of the entry time range and an avoidance time range of the second example of a connection point.

FIG. 6A schematically illustrates a third example of a connection point, FIG. 6B illustrates an entry time range for the third example of a connection point, and FIG. 6C is a time chart of the entry time range of the third example of a connection point.

DESCRIPTION OF EMBODIMENTS

A travel planner that can create a smoother travel plan at a connection point in a travel lane will now be described in detail with reference to the attached drawings. The travel planner identifies, for a connection point, an entry time range representing a time range during which entry of a vehicle from a travel lane to the connection point is recommended. The connection point is a point where the travel lane in which the vehicle is traveling connects ahead of the vehicle with another lane different from the travel lane. The travel planner creates a travel plan including a transition of travel speed of the vehicle from a current position of the vehicle to the connection point so as to arrive at the connection point within the entry time range.

Figure 1:
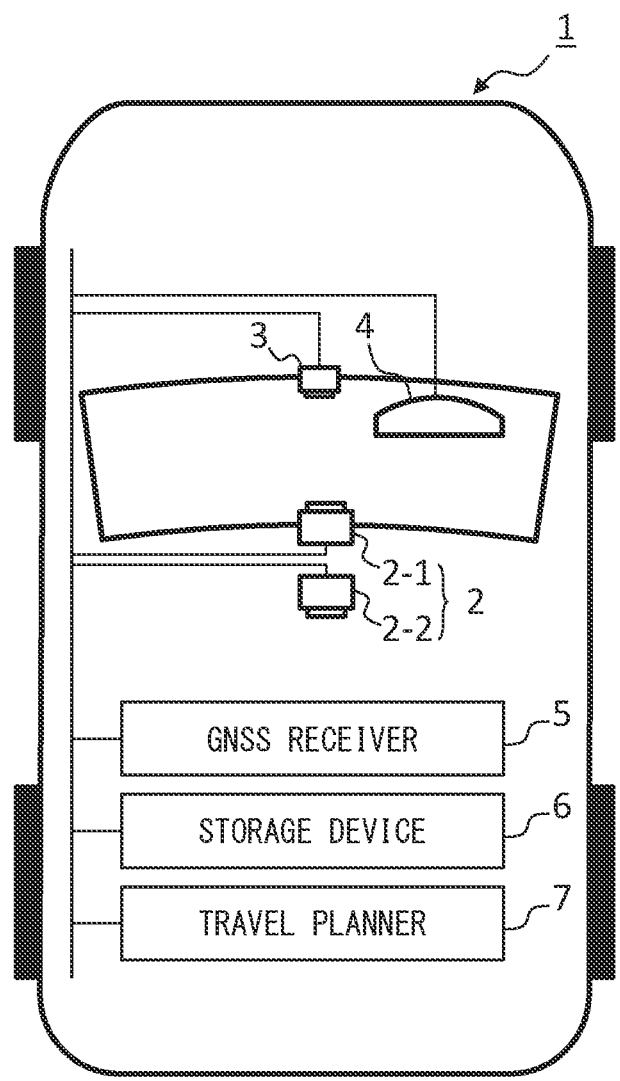
FIG. 1 schematically illustrates the configuration of a vehicle equipped with a travel planner.

FIG. 1 schematically illustrates the configuration of a vehicle equipped with a travel planner.

The vehicle 1 includes a surrounding camera 2, an in-cabin camera 3, a meter display 4, a global navigation satellite system (GNSS) receiver 5, a storage device 6, and a travel planner 7. The surrounding camera 2, the in-cabin camera 3, the meter display 4, the GNSS receiver 5, and the storage device 6 are connected to the travel planner 7 via an in-vehicle network conforming to a standard such as a controller area network so that they can communicate with each other.

The surrounding camera 2 is an example of a surrounding sensor for generating surrounding data representing the situation around the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 includes a front surrounding camera 2-1 and a back surrounding camera 2-2. The front surrounding camera 2-1 is disposed, for example, in a front upper part of a cabin of the vehicle 1 and oriented forward, while the back surrounding camera 2-2 is disposed in a back upper part of the cabin and oriented backward. The front surrounding camera 2-1 and the back surrounding camera 2-2 take pictures of the surroundings of the vehicle 1 through a windshield or a rear glass every predetermined capturing period (e.g., $1/30$ to $1/10$ seconds). The front surrounding camera 2-1 and the back surrounding camera 2-2 output front data and back data respectively representing the front and rear situations as surrounding data. The vehicle 1 may include, as the surrounding sensor, a sensor other than the surrounding camera 2, such as a LiDAR (Light Detection and Ranging) sensor that generates, as surrounding data, a range image whose pixels each has a value depending on the distances to an object represented in the pixels, based on the surrounding situations of the vehicle 1.

The in-cabin camera 3 is an example of an in-cabin sensor for generating an in-cabin data representing the situation in the cabin of the vehicle 1. The in-cabin camera 3 includes a two-dimensional detector constructed from an array of optoelectronic transducers, such as CCD or C-MOS, having sensitivity to infrared light, a focusing optical system that forms an image of a target region on the two-dimensional detector. The in-cabin camera 3 includes a light source that emits infrared light. The in-cabin camera 3 is attached, for example, to a front area in the cabin and is oriented toward the rear of the cabin. The in-cabin camera 3 irradiates the interior of the cabin with infrared light every predetermined capturing period (e.g., $1/30$ to $1/10$ seconds) and outputs images representing the situation inside the cabin in time series. The vehicle 1 may include a sensor other than the in-cabin camera 3 as the in-cabin sensors such as a seat sensor which measures the weight applied to the seating surface of each seat and outputs a sensor signal corresponding to the weight.

The meter display 4 is an example of an output device, and includes, for example, a liquid crystal display. The meter display 4 displays information regarding the created travel plan to the driver in accordance with signals received from the travel planner 7 via the in-vehicle network.

The GNSS receiver 5 receives GNSS signals from GNSS satellites at predetermined intervals and determines the position of the vehicle 1 based on the received GNSS signals. The GNSS receiver 5 outputs a positioning signal indicating the result of determination of the position of the vehicle 1 based on the GNSS signal to the travel planner 7 via the in-vehicle network at predetermined period. The GNSS receiver 5 detects the current time from time information included in the GNSS signal.

The storage device 6 is an example of a storage unit, and includes, for example, a hard disk device or non-volatile semiconductor memory. The storage device 6 stores map data including information regarding lanes traveled by the vehicle 1 and connection points. The information regarding connection points includes an entry time range for each lane connected to the connection point.

The travel planner 7 creates a travel plan including a transition of travel speed of the vehicle 1 to the connection point based on the information regarding connection points included in the map data stored in the storage device 6.

Figure 2:
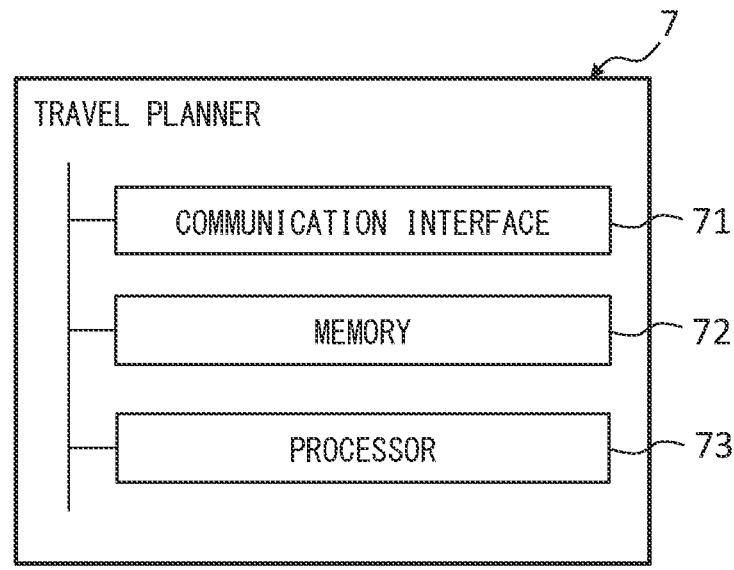
FIG. 2 schematically illustrates the hardware of the travel planner.

FIG. 2 schematically illustrates the hardware of the travel planner 7. The travel planner 7 includes a communication interface 71, a memory 72, and a processor 73.

The communication interface 71 is an example of a communication unit and includes a communication interface circuit for connecting the travel planner 7 to the in-vehicle network. The communication interface 71 provides the received data for the processor 73. The communication interface 71 outputs data provided from the processor 73 to an external device.

The memory 72 includes volatile and nonvolatile semiconductor memories. The memory 72 contains various types of data used for processing by the processor 73, such as acceleration/deceleration conditions for determining the range of travel speed change (acceleration/deceleration). The memory 72 also contains various application programs, such as a program for travel planning to execute a process therefor.

The processor 73 is an example of a control unit and includes one or more processors and peripheral circuits thereof. The processor 73 may further includes another operating unit, such as a logic-arithmetic unit, an arithmetic unit, or a graphics processing unit.

Figure 3:
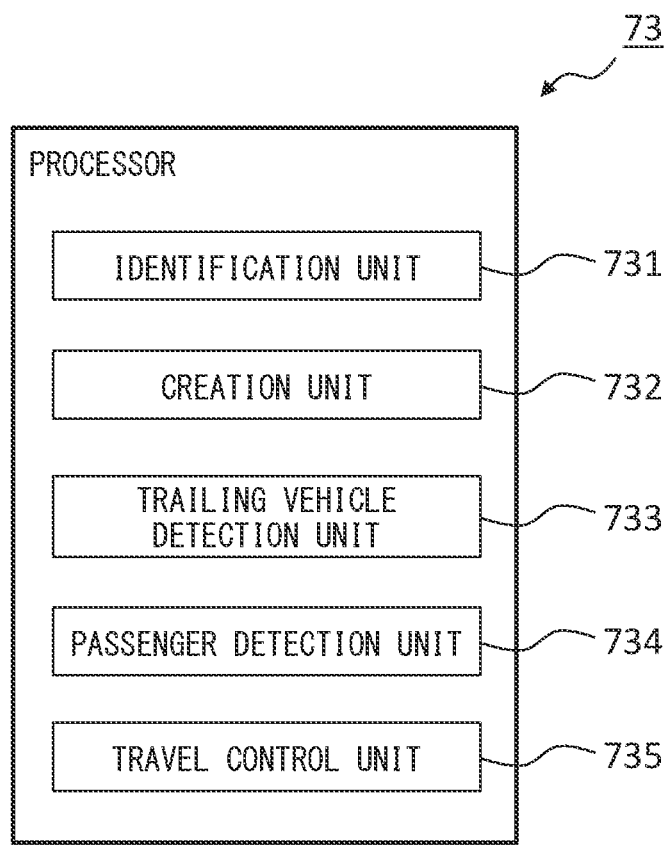
FIG. 3 is a functional block diagram of a processor included in the travel planner.

FIG. 3 is a functional block diagram of the processor 73 included in the travel planner 7.

As functional blocks, the processor 73 of the travel planner 7 includes an identification unit 731, a creation unit 732, a trailing vehicle detection unit 733, a passenger detection unit 734, and a travel control unit 735. These units included in the processor 73 are functional modules implemented by a computer program executed on the processor 73. A computer program for achieving the functions of the units of the processor 73 may be provided in a form recorded in a computer-readable and portable recording medium such as a semiconductor memory, magnetic recording medium, or optical recording medium. Alternatively, the units included in the processor 73 may be implemented in the travel planner 7 as separate integrated circuits, microprocessors, or firmware.

The identification unit 731 identifies, for a connection point where a travel lane in which the vehicle 1 is traveling connects ahead of the vehicle 1 with another lane different from the travel lane, an entry time range representing a time range during which entry of the vehicle 1 from the travel lane to the connection point is recommended.

The identification unit 731 identifies the connection point ahead of the travel lane in reference to the map data stored in the storage device 6 for the vicinity of its position indicated by the positioning signal received from the GNSS receiver 5 and identifies the entry time range for the travel lane at the connection point.

The information regarding connection points may be stored in a map server (not illustrated). In this case, the identification unit 731 transmits the positioning signal acquired from the GNSS receiver 5 to the map server via a data communication module (not illustrated) connected to the communication interface 71 and the in-vehicle network. The map server transmits to the travel planner 7 map data representing the situation in the vicinity of the position indicated by the transmitted positioning signal. The identification unit 731 identifies a connection point ahead of the travel lane based on the map data acquired from the map server and identifies the entry time range for the connection point.

FIGS. 4A to C, 5A to C, and 6A to C illustrate first to third examples of connection points and entry time ranges for these connection points. In the first to third examples of connection points, traffic lights for controlling vehicle entry are not installed at any of the connection points. However, the travel planner 7 can create a travel plan also for connection points where traffic lights are installed.

Connection point CP1 shown in FIG. 4A is a first example of a connection point. The connection point CP1 is an intersection where a road having lanes L11 and L12 is connected to a road having lanes L13 and L14, a road having lanes L15 and L16, and a road having lanes L17 and L18.

The storage device 6 stores map data including information representing an entry time range during which entry of a vehicle from the lane to the connection point CP1 is recommended for each of the lanes L11, L13, L15, and L17, from which the connection point CP1 can be entered.

The entry time range is defined by the time elapsed from the commencement of a repeated predetermined period (for example, 30 seconds) started at a predetermined time (for example, Jan. 1, 2000, 00:00:00). In the examples shown in FIGS. 4B and 4C, the entry time range from lanes L11 and L13 to connection point CP1 is 15 seconds (0:00 to 0:15) from the commencement of each period. The entry time range from lanes L15 and L17 to connection point CP1 is 5 seconds (0:20 to 0:25) after 20 seconds have elapsed from the commencement of each period.

At the connection point CP1 where the entry time range is set in this manner it is recommended that vehicles enter from lanes L11 and L13 for 15 seconds after the commencement of each period, and vehicles enter from lanes L15 and L17 for 5 seconds after 20 seconds have elapsed from the commencement. When each vehicle travels through the connection point CP1 in accordance with the entry time range, a vehicle that arrives at the connection point CP1 within the entry time range can be expected to enter the connection point CP1 without waiting for vehicles entering from other lanes to pass.

In the first example of connection point, the same entry time range is set for entry from a certain lane regardless of the exit destination lane from connection point CP1, but the entry time range may be set so as to differ depending on the exit destination lane. For example, at connection point CP1, the entry time range for entry from lane L11 for exiting to lane L18 may be 19 seconds (0:00 to 0:19) from the commencement of each period. By setting in this manner, a vehicle which has entered from lane L11 can surely exit to lane L18 at least within a time range (0:15 to 0:19) where entry from another lane connected to connection point CP1 is not recommended. A vehicle which entered from lane L11 may exit to lane L18 even within the recommended time range (0:00 to 0:15) for entry from lane L13, when it is confirmed that there is no vehicle entry from lane L13.

Connection point CP2 shown in FIG. 5A is a second example of a connection point. The connection point CP2 is an intersection where a road having lanes L21 and L22 is connected to a road having lanes L23 and L24, a road having lanes L25 and L26, and a road having lanes L27 and L28. A stop line is provided before connection point CP2 in lanes L25 and L27, and a temporary stop is required before entry to connection point CP2. The connection point CP2 corresponds to a temporary stop connection point where it is necessary to stop before entering from lanes L25 and L27.

the storage device 6 stores map data including, in addition to the entry time range for each of lanes L21, L23, L25, and L27 from which connection point CP2 can be entered, information representing an avoidance time range during which avoidance of entry of the vehicle from the lane to the connection point CP2 is recommended.

The avoidance time range, as well as the entry time range, is defined by the time elapsed from the commencement of the repeated predetermined period started at the predetermined time. In the examples shown in FIGS. 5B and 5C, the entry time range is set in the same manner as for the connection point CP1. The avoidance time range is not set for entries from lanes L21 and L23 to connection point CP2. The avoidance time range of entry from lanes L25 and L27 to connection point CP2 is set to 16 seconds (0:02 to 0:18) after 2 seconds have elapsed from the commencement of each period.

At the connection point CP2, where the entry time range and avoidance time range are set in this manner, it is recommended that vehicles avoid entry from lanes L25 and L27 for 16 seconds after 2 seconds have elapsed from the commencement of each period. Therefore, vehicles traveling lanes L21 and L23 can more safely enter connection point CP2 in this time range.

In the case that the avoidance time range is set in this manner, the time range for entry from lanes L25 and L27 to connection point CP2 is restricted. Since a temporary stop is required to enter connection point CP2 from lanes L25 and L27, it is relatively easy to accept the avoidance time range.

Connection point CP3 shown in FIG. 6A is a third example of a connection point. The connection point CP3 is a point set so that vehicles can perform a lane change in lanes L31 and L32 having the same direction of travel. In this example, lanes L31 and L32 after passing through the connection point CP3 become lanes L33 and L34, respectively. The connection point CP3 may not be visibly indicated on the road by road signs, road markings, or the like.

The storage device 6 stores map data including information representing the entry time range for each of the lanes L31 and L32 from which connection point CP3 can be entered, for each exit destination lane from the connection point CP3.

In the examples shown in FIGS. 6B and 6C, a vehicle traveling in lane L31 can always go straight to lane L33 in each period, and after 3 seconds from the commencement, can perform lane change to lane L34 for 2 seconds (0:03 to 0:05). A vehicle traveling in lane L32 can go straight to lane L34 for 2 seconds (0:00 to 0:02) from the commencement in each period, but can never perform lane change to lane L33.

At the connection point CP3, where the entry time range is set in this manner, the entry time range for lane change from lane L31 to lane L34 and the entry time range for going straight from lane L32 to lane L34 do not overlap. Thus, vehicles traveling lanes L31 and L32 can more safely enter connection point CP3 towards lane L34.

Returning to FIG. 3, the creation unit 732 creates a travel plan for the vehicle 1 so as to arrive at the connection point within the entry time range. The creation unit 732 estimates the standard arrival time to the connection point based on the distance from the current position of the vehicle 1 to the connection point and the transition of the travel speed of the vehicle 1 to the connection point included in the current travel plan. The creation unit 732 sets the scheduled arrival time based on the relationship between the estimated standard arrival time and the entry time range of the connection point. The creation unit 732 can set the scheduled arrival time between the earliest arrival time and the latest arrival time provided before and after the standard arrival time. The earliest arrival time and the latest arrival time are limit values of the arrival time for the vehicle 1 to travel safely and avoiding strangeness of the occupants of the vehicle 1. The creation unit 732 can set the earliest and latest arrival times, for example, by respectively adding to the standard arrival time the maximum shortening time (for example, −2 seconds) and the maximum extending time (for example, 5 seconds) determined in accordance with the distance from the current position of vehicle 1 to the connection point and the speed of vehicle 1. The creation unit 732 creates a travel plan to arrive at the connection point at the scheduled arrival time.

Figure 7:
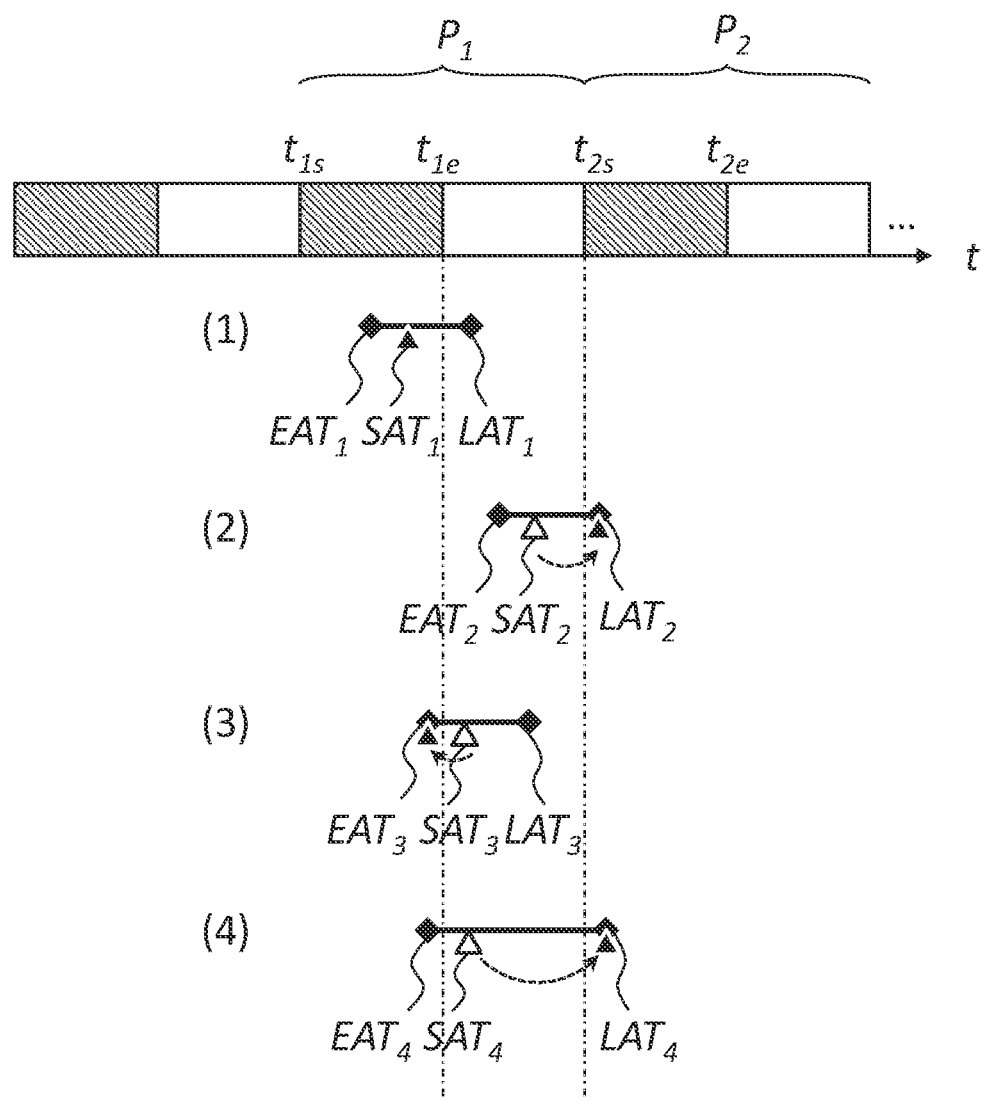
FIG. 7 illustrates a setting of a scheduled arrival time at a connection point.

FIG. 7 illustrates the setting of the scheduled arrival time at the connection point. In FIG. 7, the entry time range of the connection point is set from time $t1_s$ to time $t1_e$ in period $P_1$, and is set similarly for other periods, such as $P_2$.

In (1) of FIG. 7, the creation unit 732 can set the standard arrival time $SAT_1$ between the earliest arrival time $EAT_1$ and the latest arrival time $LAT_1$. The standard arrival time $SAT_1$ is included in the entry time range in period $P_1$. In this case, the creation unit 732 sets the standard arrival time $SAT_1$ as the scheduled arrival time.

In (2) of FIG. 7, the creation unit 732 can set the standard arrival time $SAT_2$ between the earliest arrival time $EAT_2$ and the latest arrival time $LAT_2$. The earliest arrival time $EAT_2$ and standard arrival time $SAT_2$ are included in a time range out of the entry time range in period $P_1$. The latest arrival time $LAT_2$ is included in the entry time range in period $P_2$. In this case, the creation unit 732 sets the latest arrival time $LAT_2$ as the scheduled arrival time.

In (3) of FIG. 7, the creation unit 732 can set the standard arrival time $SAT_3$ between the earliest arrival time $EAT_3$ and the latest arrival time $LAT_3$. The standard arrival time $SAT_3$ and latest arrival time $LAT_3$ are included in the time range out of the entry time range in period $P_1$. The earliest arrival time $EAT_3$ is included in the entry time range in period $P_1$. In this case, the creation unit 732 sets the earliest arrival time $EAT_3$ as the scheduled arrival time.

In (4) of FIG. 7, the creation unit 732 can set the standard arrival time $SAT_4$ between the earliest arrival time $EAT_4$ and the latest arrival time $LAT_4$. The standard arrival time $SAT_4$ is included in a time range out of the entry time range in period $P_1$. The earliest arrival time $EAT_4$ is included in the entry time range in period $P_1$. The latest arrival time $LAT_4$ is included in the entry time range in period $P_2$. The creation unit 732 can set the earliest arrival time $EAT_4$ or the latest arrival time $LAT_4$ as the scheduled arrival time. In this case, the creation unit 732 can create a safer travel plan by setting the latest arrival time $LAT_4$ as the scheduled arrival time.

Figure 8:
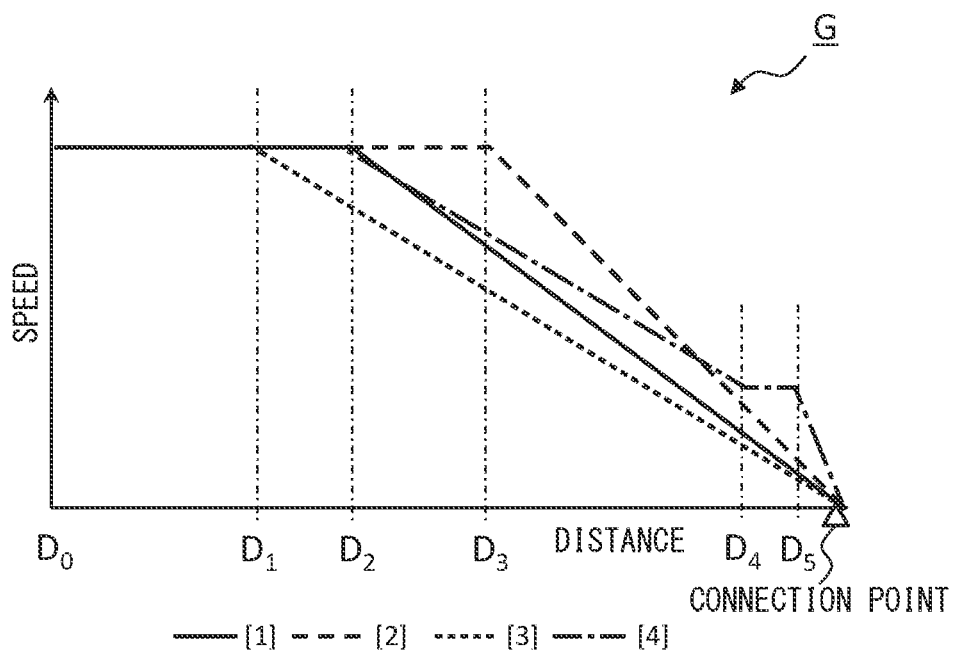
FIG. 8 illustrates a travel speed transition of a vehicle until arriving at a connection point.

FIG. 8 illustrates the travel speed transition of the vehicle 1 until arriving at the connection point. In graph G shown in FIG. 8, the vertical axis indicates the speed of the vehicle 1, and the horizontal axis indicates the distance from the vehicle 1 to the connection point (growing closer towards the right). The vehicle 1 is traveling at a first speed (for example, 6 m/s) to a point at a distance $D_0$ (for example, 80 m) (hereinafter referred to as "point $D_0$") from the connection point. The creation unit 732 creates a travel plan so that the speed when the vehicle 1 arrives at the connection point is a second speed (for example, 0 m/s).

Series [1] in FIG. 8 represents an example of a travel speed transition of the vehicle 1 in a standard travel plan. In accordance with the series [1], the plan is created so that the vehicle 1 travels at the first speed to a predetermined point, travels from the predetermined point at a first acceleration (for example, −0.36 m/s²) while changing speed (decelerating) from the first speed, and arrives at the connection point at the second speed.

The creation unit 732 calculates the time required to change the first speed to the second speed at the first acceleration (for example, 16.7 seconds), and calculates a distance $D_2$ (for example, 50 m) traveled by the vehicle 1 during that time. A point at the distance $D_2$ from the connection point (point $D_2$) corresponds to the predetermined point in the travel plan corresponding to the series [1]. In the travel plan corresponding to the series [1], the scheduled arrival time for arriving at the connection point is calculated by adding, to the time at which the vehicle 1 has traveled through point $D_0$, the sum of the travel time from point $D_0$ to point $D_2$ (for example, 5.0 seconds) and the travel time from point $D_2$ to connection point (for example, 21.7 seconds). In description of FIG. 8 below, description of the scheduled arrival time is replaced with the travel time.

Series [2] in FIG. 8 represents an example of a travel speed transition of the vehicle 1 in a travel plan in which the scheduled arrival time is changed to a time earlier than the scheduled arrival time in the standard travel plan. In the travel plan corresponding to the series [2], the plan is set so that the vehicle 1 travels to a predetermined point at the first speed, travels from the predetermined point while changing speed (decelerating) from the first speed at a second acceleration (for example, $-0.5$ m/s$^2$) having an absolute value greater than the absolute value of the first acceleration, and arrives at the connection point at the second speed.

The creation unit 732 calculates the time required to change the first speed to the second speed at the second acceleration (for example, 12.0 seconds), and calculates a distance $D_3$ (for example, 36 m) that the vehicle 1 travels during that time. A point at the distance $D_3$ from the connection point (point $D_3$) corresponds to the predetermined point in the travel plan corresponding to the series [2]. In the travel plan corresponding to the series [2], the travel time from the point $D_0$ to the connection point is the sum of the travel time from the point $D_0$ to the point $D_3$ (for example, 7.3 seconds) and the travel time from the point $D_3$ to the connection point (for example, 19.3 seconds).

Series [3] in FIG. 8 represents a first example of a travel speed transition of the vehicle 1 in a travel plan in which the scheduled arrival time is changed to a time later than the scheduled arrival time in the standard travel plan. In the travel plan corresponding to the series [3], the plan is set so that the vehicle 1 travels to a predetermined point at the first speed, travels from the predetermined point while changing speed (decelerating) from the first speed at a third acceleration (for example, $-0.3$ m/s$^2$) having an absolute value less than the absolute value of the first acceleration, and arrives at the connection point at the second speed.

The creation unit 732 calculates the time required to change the first speed to the second speed at the third acceleration (for example, 20.0 seconds), and calculates the distance $D_1$ that the vehicle 1 travels during that time (for example, 60 m). A point at the distance $D_1$ from the connection point (point $D_1$) corresponds to the predetermined point in the travel plan corresponding to the series [3]. In the travel plan corresponding to the series [3], the travel time from the point $D_0$ to the connection point is the sum of the travel time from the point $D_0$ to the point $D_1$ (for example, 3.3 seconds) and the travel time from the point $D_1$ to the connection point (for example, 23.3 seconds).

Series [4] in FIG. 8 represents a second example of the travel speed transition of the vehicle 1 in the travel plan in which the scheduled arrival time is changed to a time later than the scheduled arrival time in the standard travel plan. In the travel plan corresponding to the series [4], the plan is set so that the vehicle 1 travels from point $D_2$ where the speed change starts in the standard travel plan, while changing speed (decelerating) from the first speed at a fourth acceleration (for example, $-0.4$ m/s$^2$) having an absolute value greater than the absolute value of the first acceleration, and arrives at a predetermined first point at a third speed (for example, 2 m/s) which is lower than the first speed and higher than the second speed. Thereafter, the vehicle 1 travels from the predetermined first point to a predetermined second point at the third speed, and travels from the predetermined point to the connection point while changing speed (decelerating) at the fourth acceleration.

The creation unit 732 calculates the time required to change the first speed to the third speed at the fourth acceleration (for example, 10.0 seconds), and calculates the distance the vehicle 1 travels during that time (for example, 40 m). The creation unit 732 calculates a distance $D_4$ from the connection point to the point where the speed of the vehicle 1 is the third speed (for example, 10 m) by subtracting the distance traveled by the vehicle 1 during the speed change (for example, 40 m) from the distance to the connection point from point $D_2$ where the speed change started (for example, 50 m). The point at the distance $D_4$ from the connection point (point $D_4$) corresponds to the predetermined first point in the travel plan corresponding to the series [4].

The creation unit 732 calculates the time required to change the third speed to the second speed at the fourth acceleration (for example, 5.0 seconds), and calculates a distance $D_5$ that the vehicle travels during that time (for example, 5 m). The point at the distance $D_5$ from the connection point (point $D_5$) corresponds to the predetermined second point in the travel plan corresponding to the series [4]. In the travel plan corresponding to the series [4], the travel time from the point $D_0$ to the connection point is the total (for example, 22.5 seconds) of the travel time from point $D_0$ to point $D_2$ (for example, 5.0 seconds), the travel time from point $D_2$ to point $D_4$, the travel time from point $D_4$ to point $D_5$ (for example, 2.5 seconds), and the travel time from the point $D_5$ to the connection point.

The creation unit 732 determines the travel speed transition so that the vehicle 1 arrives at the connection point in the required time corresponding to the difference between the scheduled arrival time and the current time, and creates a travel plan.

The creation unit 732 can calculate a travel plan for changing the current state (time t, distance d, velocity v, acceleration a) of the vehicle 1 to an arbitrary state (time t', distance d', velocity v', acceleration a') which satisfies given constraints in accordance with the following formulas. Assuming that jerk, snap, and crackle (degree of change in snap) are finite, based on the following formulas, the jerk, snap, and crackle can be obtained from the current state, the state when arriving at the connection point, and the required time (t'-t) for the state transition. The creation unit 732 creates a travel plan in accordance with the solved jerk, snap, and crackle.

$$d'^{(t)} = d + vt + \frac{1}{2!}t^2 a + \frac{1}{3!}t^2 j + \frac{1}{4!}t^2 d + \frac{1}{5!}t^2 c$$

$$v'^{(t)} = v + ta + \frac{1}{2!}t^2 j + \frac{1}{3!}t^2 s + \frac{1}{4!}t^2 c$$

$$a'^{(t)} = a + tj + \frac{1}{2!}t^2 s + \frac{1}{3!}t^2 c$$

$$\begin{pmatrix} \Delta distance \\ \Delta velocity \\ \Delta acceleration \end{pmatrix} =$$

$$\begin{pmatrix} d' - (d + vt + at^2/2) \\ v' - (v + at) \\ a' - a \end{pmatrix} = \begin{pmatrix} \frac{1}{3!}t^3 & \frac{1}{4!}t^4 & \frac{1}{5!}t^5 \\ \frac{1}{2}t^2 & \frac{1}{3!}t^3 & \frac{1}{4!}t^4 \\ 1t & \frac{1}{2!}t^2 & \frac{1}{3!}t^3 \end{pmatrix} \begin{pmatrix} jerk \\ snap \\ crackle \end{pmatrix}$$

$$\begin{pmatrix} jerk \\ snap \\ crackle \end{pmatrix} = \begin{pmatrix} \frac{1}{3!}t^3 & \frac{1}{4!}t^4 & \frac{1}{5!}t^5 \\ \frac{1}{2}t^2 & \frac{1}{3!}t^3 & \frac{1}{4!}t^4 \\ 1t & \frac{1}{2!}t^2 & \frac{1}{3!}t^3 \end{pmatrix}^{-1} \begin{pmatrix} \Delta distance \\ \Delta velocity \\ \Delta acceleration \end{pmatrix}$$

When an avoidance time range is identified for the connection point, the creation unit 732 also creates the travel plan so as not to arrive at the connection point within the avoidance time range. For example, in the second example of a connection point shown in FIG. 5, assume that the avoidance time range includes the standard arrival time and the earliest arrival time to the connection point CP2 of the vehicle heading from the lane L25 to the connection point CP2, and the latest arrival time is in a time range which is in neither the entry time range nor the avoidance time range. In this case, the creation unit 732 sets the scheduled arrival time to a time earlier than the latest arrival time among the times included in the time range which is in neither the entry time range nor the avoidance time range.

The creation unit 732 may acquire in advance a travel route created from the current position of the vehicle 1 indicated by the positioning signal outputted by the GNSS receiver 5 to the designated destination. The creation unit 732 may refer to the map information stored in the storage device 6 to create a travel route in advance in accordance with a predetermined route search method such as the Dijkstra method. The creation unit 732 can identify the exit lane from the connection point in reference to the travel route, and create a travel plan which appropriately arrives at the connection point for which a different entry time range is set depending on the exit destination lane.

The creation unit 732 may output the created travel plan via an output device. For example, the creation unit 732 causes the meter display 4 to display information regarding the travel plan visibly to the driver. The travel plan information includes, for example, the difference between the vehicle speed according to the standard travel plan arriving at the connection point at the standard arrival time and the vehicle speed according to the current travel plan. By outputting such information, the driver can understand the reason for behavior different from the behavior according to the standard travel plan. In addition, the creation unit 732 may output information regarding the travel plan such as the distance to the connection point, and the entry time range and the avoidance time range which are set for the connection point.

When the vehicle 1 is traveling by manual driving, the driver can control the speed of the vehicle 1 based on the travel plan information outputted by the creation unit 732.

Returning to FIG. 3, the trailing vehicle detection unit 733 detects a trailing vehicle traveling behind the vehicle 1 from the surrounding images representing the situation behind the vehicle 1. The trailing vehicle detection unit 733 receives back data from the back surrounding camera 2-2 via the communication interface 71. The trailing vehicle detection unit 733 detects a trailing vehicle traveling behind vehicle 1 by inputting the received back data into a classifier that has been trained to detect trailing vehicles.

The classifier may be a convolutional neural network (CNN) having a plurality of convolution layers connected in series from the input toward the output, such as YOLO (You Only Look Once) and SSD (Single Shot MultiBox Detector). A CNN that has been trained in accordance with a predetermined training technique such as backpropagation, by using large number of images including trailing vehicles as training data, operates as a classifier to detect the trailing vehicle from the images. A machine learning algorithm such as a support vector machine (SVM) or AdaBoost may be used for the classifier. An SVM trained to determine support vectors for identifying whether or not a trailing vehicle is included in various regions in the back data operates as a classifier for detecting trailing vehicles.

The passenger detection unit 734 detects a passenger other than the driver capable of executing the driving operation of vehicle 1 from the in-cabin data representing the situation inside the cabin. The passenger detection unit 734 receives the in-cabin data from the in-cabin camera 3 via the communication interface 71. The passenger detection unit 734 detects a passenger different from the driver by inputting the received in-cabin data to a classifier that has been trained to detect passengers. A CNN or other machine learning algorithm can be used as the classifier.

When the vehicle 1 includes a seat sensor as the in-cabin sensor, the passenger detection unit 734 may detect a passenger based on a sensor signal received from the seat sensor via the communication interface 71.

The travel control unit 735 executes travel control including at least acceleration/deceleration control for the vehicle 1 in accordance with the travel plan. The travel control unit 735 outputs control signals to a travel mechanism (not illustrated) of the vehicle 1 via the communication interface 71 so that the vehicle 1 travels at a vehicle speed corresponding to the transition of travel speed included in the travel plan. The travel mechanism includes a drive source, such as an engine or motor which powers the vehicle 1, and a brake which reduces the travel speed of the vehicle 1.

After arriving at the connection point, the travel control unit 735 confirms that there are no vehicles entering from another lane, and controls the travel of vehicle 1 to enter the connection point.

The travel control unit 735 detects other vehicles entering the connection point from front data representing the situation in front of the vehicle 1. The travel control unit 735 receives the front data from the front surrounding camera 2-1 via the communication interface 71. The travel control unit 735 detects other vehicles entering the connection point by inputting the received front data into a classifier that has been trained to detect other vehicles. A CNN or other machine learning algorithm can be used as the classifier.

The travel control unit 735 executes control of the travel of the vehicle 1 so as to enter the connection point when there are no other vehicles entering the connection point, and to stop without entering the connection point when there is another vehicle entering the connection point. The travel control unit 735 may control the steering mechanism that steers the vehicle 1 in addition to the drive source and brakes.

The travel control unit 735 may not execute travel control in accordance with the travel plan created by the creation unit 732 when a trailing vehicle is not detected by the trailing vehicle detection unit 733. In this case, the creation unit 732 executes travel control in accordance with, for example, a standard travel plan with which the vehicle 1 arrives at the connection point at the standard arrival time.

The entry time range set for the connection point indicates the recommended time range for vehicle entry to the connection point, but does not mean to prohibit entry at other times. A vehicle arriving at a connection point can enter the connection point when there are no vehicles entering from another lane at that time. When a vehicle arrives at a connection point at a standard arrival time without executing travel control in accordance with the travel plan, while it may be possible to enter the connection point between the arrival time and the entry time range immediately thereafter, there is also a risk of unnatural behavior such as an unnecessary stoppage before the connection point. Since such behavior of the vehicle may give a trailing vehicle a suspicious impression, it is preferable to cancel the travel control in accordance with the travel plan only when a trailing vehicle is not detected.

The travel control unit 735 may not execute travel control in accordance with the travel plan created by the creation unit 732 when the passenger detection unit 734 does not detect a passenger different from the driver.

The unnatural behavior of the vehicle which may occur when arriving at the connection point at the standard arrival time without executing travel control in accordance with the travel plan can give a suspicious impression to passengers other than the driver. Therefore, it is preferable to cancel the travel control in accordance with the travel plan only when no passengers other than the driver are detected.

It is not necessary that the travel control unit 735 execute travel control in accordance with the travel plan created by the creation unit 732 when the connection point is a temporary stop connection point according to the identification unit 731.

At temporary stop connection points, even if a vehicle arrives within the entry time range, it cannot enter the connection point without first stopping. Specifically, at a temporary stop connection point, smooth travel at the connection point cannot be realized even by travel control in accordance with the travel plan. Therefore, it is preferable to arrive at the connection point at the standard arrival time without executing travel control in accordance with the travel plan since it may be possible to enter the connection point earlier.

Figure 9:
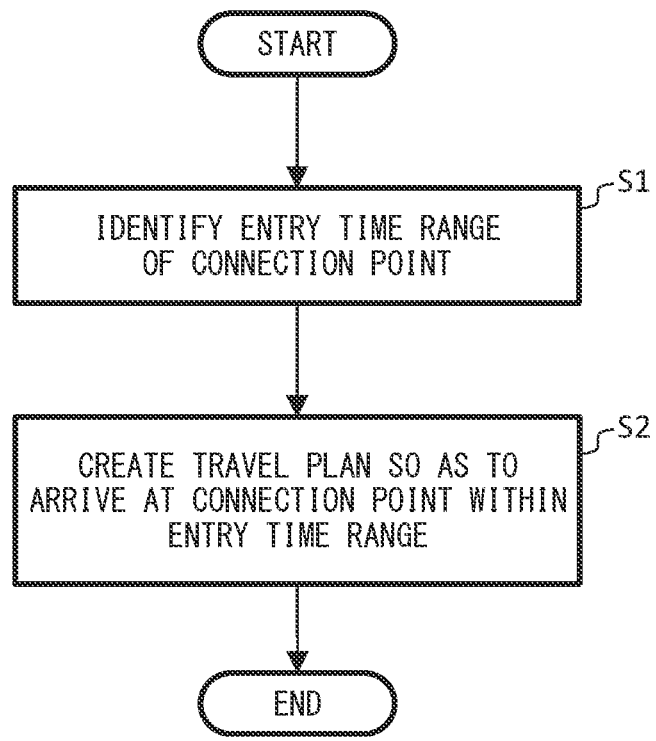
FIG. 9 is a flowchart of a process for travel planning.

FIG. 9 is a flowchart of the process for travel planning. The processor 73 of the travel planner 7 executes the process for travel planning described below when the distance from vehicle 1 to the connection point falls below a predetermined distance threshold.

First, the identification unit 731 of the processor 73 of the travel planner 7 identifies the entry time range for a connection point where the travel lane in which the vehicle 1 is traveling connects ahead of the vehicle with another lane different from the travel lane (step S1).

Next, the creation unit 732 of the processor 73 creates a travel plan including a transition of the travel speed of the vehicle 1 from the current position of the vehicle 1 to the connection point so as to arrive at the connection point within the entry time range (step S2), and terminates the process for travel planning.

Such a process for travel planning enables the travel planner to create a smoother travel plan at the connection point in the travel lane.

According to a modified example, the information regarding the connection points may be provided by information providing devices installed around each connection point. The information providing devices are, for example, bulletin boards on which two-dimensional barcodes embedded with information regarding the connection point are printed. Information embedded in the two-dimensional barcode are, for example, information which identifies the location of the connection point ahead of the installation location (for example, the distance from the installation location, latitude and longitude, etc.) and information indicating the entry time range when entering from the lane where the two-dimensional barcode is installed to the identified connection point.

For example, for the connection point CP1 shown in FIG. 4A, the entry time range for entering from lane L11 and exiting to lanes L14, L16, or L18 is embedded in the two-dimensional barcode installed before the connection point CP1 in lane L11.

In addition to information indicating the entry time range, information indicating the avoidance time range may also be embedded in the two-dimensional barcode.

In this modified example, the identification unit 731 identifies the position of the connection point ahead of the travel lane and the entry time range therefor by decoding the two-dimensional barcode from the surrounding data generated by the surrounding camera 2 and representing the two-dimensional barcode.

Note that those skilled in the art can apply various changes, substitutions, and modifications without departing from the spirit and scope of the present disclosure.

What is claimed is:

1. A travel planner, comprising a processor configured to:
   identify, for a connection point where a travel lane in which a vehicle is traveling connects ahead of the vehicle with another lane different from the travel lane, an entry time range representing a time range during which entry of the vehicle from the travel lane to the connection point is recommended,
   create a travel plan including a transition of travel speed of the vehicle from a current position of the vehicle to the connection point so as to arrive at the connection point within the entry time range,
   executes travel control including control of at least acceleration/deceleration of the vehicle in accordance with the travel plan,
   detects a trailing vehicle traveling behind the vehicle from rear data representing a situation behind the vehicle, and
   in the travel control, does not execute travel control in accordance with the travel plan when no trailing vehicles are detected.

2. The travel planner according to claim 1, wherein the entry time range is a time range, in a predetermined period repeating from a predetermined time, defined by an elapsed time from start of the period.

3. The travel planner according to claim 1, wherein the processor:
   in the identification, further identifies, for the connection point, an avoidance time range representing a time range during which avoidance of entry of the vehicle from the travel lane to the connection point is recommended, and
   in the creation, creates the travel plan so as not to arrive at the connection point within the avoidance time range.

4. The travel planner according to claim 1, wherein the processor, in the identification, identifies the connection point where a traffic light for controlling entry of the vehicle is not installed, and identifies the entry time range for this connection point.

5. The travel planner according to claim 1, wherein the processor, in the identification, identifies the entry time range by identifying the lane connected to the connection point based on the current position and a direction of travel of the vehicle in reference to a storage device mounted on the vehicle previously storing the entry time range for each lane connected to the connection point.

6. The travel planner according to claim 1, wherein the processor:
further detects a passenger different from a driver capable of executing driving operations of the vehicle from in-cabin data representing a situation in a cabin of the vehicle, and
in the travel control, does not execute travel control in accordance with the travel plan when no passengers other than the driver are detected.

7. The travel planner according to claim 1, wherein the processor:
in the identification, further identifies whether or not the connection point is a temporary stop connection point where it is necessary to stop before entering from the travel lane, and
in the travel control, does not execute travel control in accordance with the travel plan when the connection point is the temporary stop connection point.

8. A method for travel planning, having a travel planner comprising a processor for creating a travel plan for a vehicle to execute a process comprising:
identifying, for a connection point where a travel lane in which a vehicle is traveling connects ahead of the vehicle with another lane different from the travel lane, an entry time range representing a time range during which entry of the vehicle from the travel lane to the connection point is recommended, and
creating a travel plan including a transition of travel speed of the vehicle from a current position of the vehicle to the connection point so as to arrive at the connection point within the entry time range,
executing travel control including control of at least acceleration/deceleration of the vehicle in accordance with the travel plan,
detecting a trailing vehicle traveling behind the vehicle from rear data representing a situation behind the vehicle, and
in the travel control, not executing travel control in accordance with the travel plan when no trailing vehicles are detected.

9. A non-transitory computer readable medium having a computer program for travel planning stored therein, the computer program causing a computer mounted on a vehicle to execute a process comprising:
identifying, for a connection point where a travel lane in which the vehicle is traveling connects ahead of the vehicle with another lane different from the travel lane, an entry time range representing a time range during which entry of the vehicle from the travel lane to the connection point is recommended, and
creating a travel plan including a transition of travel speed of the vehicle from a current position of the vehicle to the connection point so as to arrive at the connection point within the entry time range,
executing travel control including control of at least acceleration/deceleration of the vehicle in accordance with the travel plan,
detecting a trailing vehicle traveling behind the vehicle from rear data representing a situation behind the vehicle, and
in the travel control, not executing travel control in accordance with the travel plan when no trailing vehicles are detected.

* * * * *